No. 746,485. PATENTED DEC. 8, 1903.
R. J. FLINN & G. P. ABORN.
CONTROLLER FOR BOILERS.
APPLICATION FILED FEB. 20, 1902.
NO MODEL. 2 SHEETS—SHEET 2.
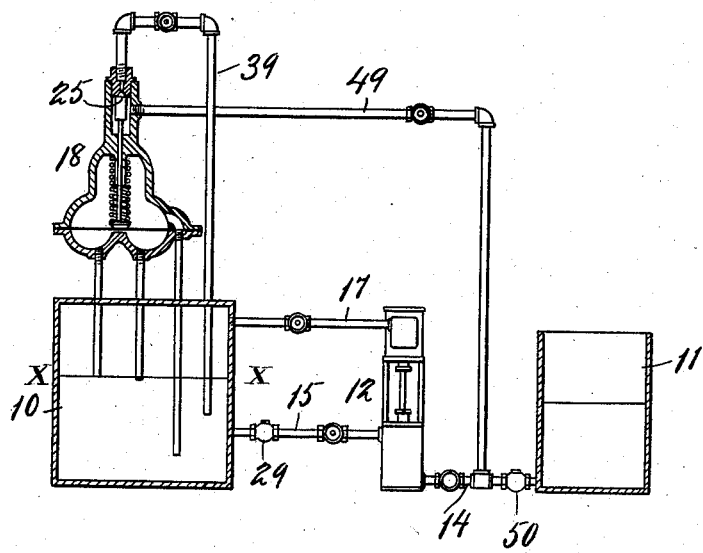
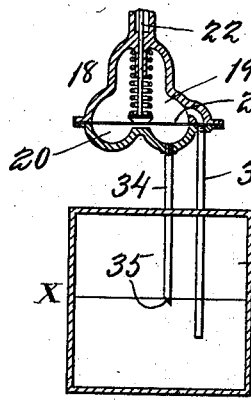
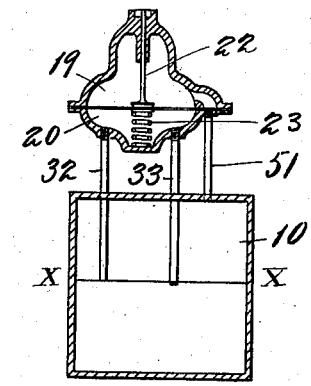
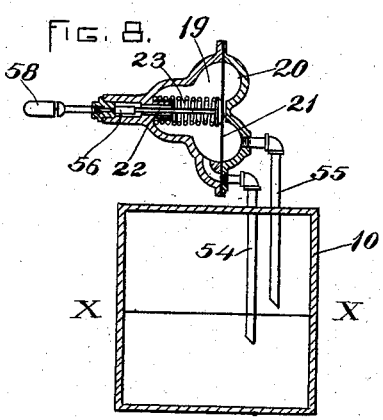
WITNESSES: INVENTORS:

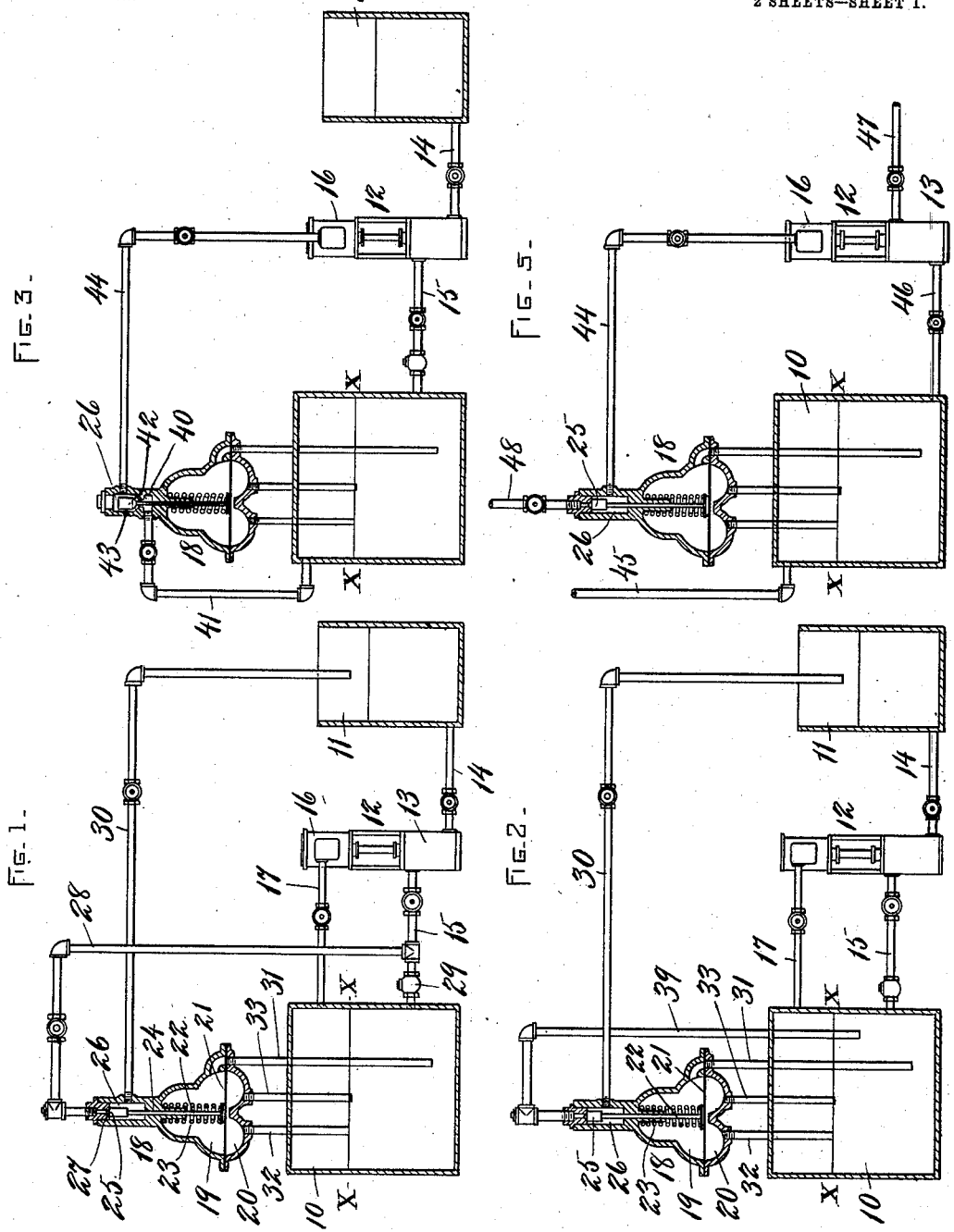

No. 746,485.

Patented December 8, 1903.

UNITED STATES PATENT OFFICE.

RICHARD J. FLINN AND GEORGE P. ABORN, OF BOSTON, MASSACHUSETTS.

CONTROLLER FOR BOILERS.

SPECIFICATION forming part of Letters Patent No. 746,485, dated December 8, 1903.

Application filed February 20, 1902. Serial No. 94,911. (No model.)

*To all whom it may concern:*

Be it known that we, RICHARD J. FLINN and GEORGE P. ABORN, of Boston, in the county of Suffolk and State of Massachusetts, have invented certain new and useful Improvements in Controllers for Boilers, &c., of which the following is a specification.

This invention relates to devices controlled by the liquid-level in a boiler or other vessel containing a liquid and the vapor thereof under pressure and operating to control mechanism for performing a suitable operation in connection with the boiler or other vessel, such as indicating the liquid-level or actively controlling said level.

The invention consists in the improved mechanism hereinafter described and claimed.

Of the accompanying drawings, Figure 1 represents a diagrammatic sectional view of a controller constructed in accordance with our invention arranged to automatically regulate the water-level in a boiler. Fig. 2 represents a similar view showing a modification. Fig. 3 represents a similar view showing a second modification. Fig. 4 represents a similar view showing a third modification. Fig. 5 represents a similar view showing a fourth modification. Fig. 6 represents a detail section showing a modification of construction of the controller. Fig. 7 represents a detail section showing another modified construction of the controller. Fig. 8 represents a sectional view of the controller arranged to give an alarm for high and low water.

The same reference characters indicate the same parts in all the figures.

Referring at first to Fig. 1, 10, it may be assumed for illustration, is a steam-boiler, 11 is a feed-tank, 12 is a steam-pump having a pump-cylinder 13 connected by a suction-pipe 14 with the feed-tank 11 and by a delivery-pipe 15 with the boiler and an engine-cylinder 16, receiving steam from the boiler through a pipe 17, (or the steam may be supplied to the pump from another source.) The system is provided with the usual check-valves and with suitable stop-valves. 18 is a regulator located above the level of the water in the boiler and comprising a casing provided with upper and lower chambers 19 20, separated by a flexible diaphragm 21, which actuates a vertically-movable stem 22, upon which a downward pressure is exerted by a spring 23. This stem passes through a long fluid-tight sleeve or bearing 24 and at its upper end is provided with a valve 25, located in a chamber 26 and coacting with a valve-seat 27. 28 is a by-pass pipe controlled by the valve 25 and connecting the chamber 26 with the delivery-pipe 15 at a point outside of the boiler check-valve 29, and 30 is a return-pipe connected with the chamber 26 and emptying into the feed-tank 11, (or it may empty elsewhere.) 31 is a pipe connecting the chamber 19 with the lower part or water-space of the boiler 10, and 32 33 are pipes connecting the chamber 20 with the interior of the boiler at the normal water-line $x \, x$. The lower orifice of one of these pipes is slightly lower than that of the other, the object being to allow the steam to ascend and the water to descend through different channels in emptying the chamber 20. If only one pipe is employed, it is preferable to have the lower end of said pipe beveled, as indicated in Fig. 6, 34 being the single pipe and 35 its beveled lower end. In both instances, however, the advantage is the same, and in each case there is a connection from the chamber 20 to the interior of the boiler or receptacle 10, which has provisions at its lower end for the entrance of steam and the exit of water at slightly-different levels. In Figs. 6 and 8 the entrance of steam and exit of water take place through the same pipe, the steam entering on the higher side of the entrance-orifice and the water leaving by the lower side, while in the remaining figures separate pipes are provided for the entrance of the steam and exit of the water. The operation of this form of our invention is as follows: Air being absent from the chamber 19, said chamber and the pipe 31 will always be full of water. The chamber 20 is alternately emptied and filled. When the water is below the normal level $x \, x$, steam enters the chamber 20, and the fluid-pressure on the other side of the diaphragm 21 is greater than the fluid-pressure on the upper side of said diaphragm by an amount due to the height of the column of water in pipe 31, extending from the water-level in the boiler to the level of diaphragm 21 and sustained by the steam-pressure acting on the water. The difference is sufficient to overcome the downward pressure of spring 23 and maintain the valve 25 closed. This function just described is due to the elevation of the two chambers of the regulator above the level of the water in the boiler. The pump 12 operates constantly and delivers a quantity of feed-water in excess of the loss caused by the average rate of vaporization. The water-level therefore rises in the boiler 10 and finally covers the lower ends of pipes 32 33. Condensation in said pipes and in the chamber 20 then causes them to fill with water from the boiler. The oppositely-acting columns of water sustained by the steam-pressure being then substantially equal in length, the spring 23 will open the valve 25 and allow the output of the pump to be by-passed through pipe 28, chamber 26, and pipe 30 back into the tank 11. When vaporization causes the water-level to again fall below the level $x\ x$, the valve 25 closes and the foregoing operations are repeated.

Fig. 2 represents a modification in which the boiler 10, feed-tank 11, pump 12, with its suction and delivery pipes and the steam-supply for its engine, and the device 18 are constructed and arranged as in the foregoing embodiment. The return-pipe 30, leading from chamber 26 to feed-tank 11, is also present, as before. 39 is an overflow-pipe leading from the interior of the boiler 10 below the water-line to the chamber 26 and controlled by the valve 25. When the water-level is below the line $x\ x$, the valve 25 remains closed and the pump raises the water-level. When the level is above $x\ x$, the valve 25 opens and the steam-pressure in the boiler forces the excess of water in said boiler out through the pipe 39, chamber 26, and pipe 30 back to the feed-tank 11. This continues until the level falls below $x\ x$, when the valve 25 again closes.

Fig. 3 represents an arrangement in which the movement of the stem 22 is utilized to control the steam-supply of the pump. The boiler 10, feed-tank 11, pump 12, and regulator 18 are arranged in mutual relation, as before. We provide in said regulator, however, a chamber 40, connecting by a steam-pipe 41 with the boiler 10 (or it may be connected to some other source of steam-supply) and having a valve-seat 42, a valve 43 in the chamber 26 controlling said valve-seat, and a pipe 44 leading from the chamber 26 to the steam-chest of the pump-engine 16. When low water raises the stem 22, the valve 43 opens and admits steam through pipe 41, chambers 40 and 26, and pipe 44 to the pump-engine and causes the pump to be operated until it restores the water to the level $x\ x$ and closes the valve 43. It will be seen that in this arrangement valve 43 constitutes a throttle-valve for the pump-engine 16.

Fig. 4 represents an arrangement for automatic circulation of the boiler-water. The boiler, feed-tank, pump, and regulator, and pipe 39 are arranged as in Fig. 2. From the chamber 26 leads a pipe 49, joining the suction-pipe 14, and in the suction-pipe back of the junction is located a check-valve 50, opening away from the tank. When high water opens the valve 25, the boiler-water flows through pipe 39, chamber 26, and pipe 49 back to the suction side of the pump, the check-valve 50 then closing, and is returned by said pump to the boiler, the boiler-water being thereby circulated until the normal water-level is restored. We thus add the advantages of a circulating apparatus to those of the automatic boiler-feeder.

Fig. 5 represents an arrangement in which 10 may be a closed receiver for the water of condensation for a steam-heating system. The water of condensation drains into said receptacle 10 through pipe 45, and the upper part of receptacle 10 is supposed to contain steam at a pressure sufficient to give the desired movement to the water-column in the regulator 18. The regulator 18 is arranged in relation to the receptacle 10 as previously described. 12 represents the pump, which in this case has a suction-pipe 46 connected to the receptacle 10 and a delivery-pipe 47 leading to any desired point of discharge. The arrangement of the valve 25 and chamber 26 is similar to that shown in Figs. 1 and 2, and the valve controls a pipe 48, leading to the chamber 26 from a suitable source of steam-pressure. A pipe 44 leads from the chamber 26 to the steam-chest of the pump-engine 16. It will readily be seen that when the water-level in receptacle 10 is below $x\ x$ the valve 25 closes, the pump 12 stops, and the water of condensation is allowed to accumulate in the receptacle. When the level rises above $x\ x$, the valve 25 opens and the pump starts in motion and discharges water from the receptacle 10 until the level is reduced below $x\ x$.

Fig. 7 represents a modification in the arrangement of the controller which applies to any of the foregoing embodiments. Instead of connecting the upper diaphragm-chamber 19 with the water-space of the boiler or other vessel we connect it by a pipe 51 with the steam-space of said boiler or vessel and cause the spring 23 to act upwardly on the diaphragm. In this way a constant pressure of steam acts on the upper surface of the diaphragm and a variable pressure acts on the lower side. The downward fluid-pressure on the diaphragm preponderates at high water when the chamber 20 fills with water and the fluid-pressures are equalized at low water. Therefore the stem 22 rises at low water and descends at high water, as in the first-described construction.

Fig. 8 shows a controller operating on the principle disclosed in Figs. 1 to 7, but in which the movement of the diaphragm is employed for giving the signal both for high and low water. Chambers 19 and 20 connect with the boiler 10 by pipes 54 and 55, respectively, having inlet-orifices at different levels in the boiler. Stem 22 operates a valve 56, adapted to stop or permit the passage of fluid from chamber 19 through a pipe 57 to a whistle 58. If the boiler-water is above the inlet of pipe 54, but below that of pipe 55, it fills pipe 54 and chamber 19, and the predominating steam-pressure in chamber 20 holds valve 56 closed, so that no alarm is given. If water falls below intake of pipe 54, steam occupies both chambers 19 20, allowing valve 56 to open and permit steam to pass to the whistle 58. If water rises so high as to cover intakes of both pipes 54 55, both chambers 19 20 will fill with water, valve 56 will open, and the boiler-water or a mixture of water and steam, due to its liberation from pressure, will pass to the whistle 58 and cause the latter to emit a sound different from the sound due to low water.

It is evident that all of the herein-described embodiments of our invention are characterized by pressure-chambers connected at different levels with a boiler or other vessel containing a liquid and the vapor thereof under pressure, both of said chambers being above the level of the liquid in said boiler or vessel, means interposed between the chambers and movable differentially by the fluid-pressures therein, and mechanism operated by said means. In all of the arrangements herein described the mechanism operated by the diaphragm is a valve, but obviously other mechanism for controlling different operations in connection with the boiler or other vessel might be employed, and various modifications may also be made in the mechanical embodiment of our differential controller.

We claim—

1. The combination of a boiler or other vessel adapted to contain a liquid and the vapor thereof under pressure, two chambers located above said vessel and connected therewith respectively at different levels, the higher-level connection having provisions at its lower end for the entrance of steam and the exit of water at slightly-different levels, means interposed between said chambers and operated differentially by the fluid-pressures therein, and mechanism operated by said means.

2. The combination of a boiler or other vessel adapted to contain a liquid and the vapor thereof under pressure, two chambers located above said vessel and connected therewith respectively at different levels, two conduits connecting said boiler with one of said chambers and forming the higher-level connection, their lower orifices being at slightly-different levels in the boiler, means interposed between said chambers and operated differentially by the fluid-pressures therein, and mechanism operated by said means.

3. The combination of a boiler or other vessel adapted to contain a liquid and the vapor thereof under pressure, two chambers located above said vessel and connected therewith respectively at different levels, two conduits connecting said boiler with one of said chambers and forming the higher-level connection, their lower orifices being at slightly-different levels in the boiler, means interposed between said chambers and operated differentially by the fluid-pressures therein, and mechanism controlled by said means for automatically maintaining a predetermined level of the liquid in said vessel.

In testimony whereof we have affixed our signatures in presence of two witnesses.

RICHARD J. FLINN.
GEORGE P. ABORN.

Witnesses:
GEORGE PEZZETTI,
R. M. PIERSON.